United States Patent
Yoo et al.

(10) Patent No.: US 9,306,489 B2
(45) Date of Patent: Apr. 5, 2016

(54) METHOD AND SYSTEM FOR CONTROLLING MOTOR OF ENVIRONMENTALLY-FRIENDLY VEHICLE

(71) Applicants: Hyundai Motor Company, Seoul (KR); Kia Motors Corporation, Seoul (KR)

(72) Inventors: Taeil Yoo, Gyeonggi-do (KR); Han Hee Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 14/138,713

(22) Filed: Dec. 23, 2013

(65) Prior Publication Data
US 2015/0102753 A1    Apr. 16, 2015

(30) Foreign Application Priority Data
Oct. 10, 2013  (KR) .................. 10-2013-0120743

(51) Int. Cl.
*H02P 6/10*   (2006.01)
*H02P 29/00*   (2006.01)
*H02P 21/05*   (2006.01)

(52) U.S. Cl.
CPC ............ *H02P 29/0038* (2013.01); *H02P 21/05* (2013.01)

(58) Field of Classification Search
CPC ....... H02P 6/10; H02P 2007/052; H02P 8/18; H02P 25/088
USPC ................. 318/400.23, 400.33, 823
See application file for complete search history.

(56) References Cited

U.S. PATENT DOCUMENTS

| | | | |
|---|---|---|---|
| 6,859,693 B2* | 2/2005 | Tamagawa et al. | 701/22 |
| 7,928,675 B2* | 4/2011 | Chen | 318/400.02 |
| 7,944,163 B2* | 5/2011 | Okumura | 318/400.32 |
| 8,018,187 B2* | 9/2011 | Schulz et al. | 318/400.33 |
| 8,058,828 B2* | 11/2011 | Lin et al. | 318/400.24 |
| 2013/0307449 A1* | 11/2013 | Kobayashi et al. | 318/400.02 |

FOREIGN PATENT DOCUMENTS

| | | |
|---|---|---|
| JP | 09-131098 A | 5/1997 |
| JP | 2008017660 A | 1/2008 |
| JP | 2008-187794 A | 8/2008 |
| JP | 2009-225633 A | 10/2009 |
| JP | 2012029474 A | 2/2012 |
| KR | 10-2011-0053092 A | 5/2011 |
| KR | 10-2013-0060907 | 6/2013 |

* cited by examiner

*Primary Examiner* — Eduardo Colon Santana
*Assistant Examiner* — Bickey Dhakal
(74) *Attorney, Agent, or Firm* — Mintz Levin Cohn Ferris Glovsky and Popeo, P.C.; Peter F. Corless

(57) ABSTRACT

A method and system for controlling a vehicle motor are provided. The system includes an inverter that controls the motor to receive a torque command from an external system and output a torque based on the torque command. Additionally, a current command is generated based on the torque command and a operation condition of the motor. A voltage command is generated to be applied to the motor based on the current command and the operation condition of the motor. A pulse width modulation (PWM) command is generated based on the voltage command and the operation condition of the motor. The PWM command is converted to a voltage in a PWM form based on the motor operation condition and is applied to the motor. Then, an unwanted torque output of the motor generated based on a nonlinear characteristic of the motor is added and subtracted to and from the torque command.

14 Claims, 9 Drawing Sheets

METHOD AND SYSTEM FOR CONTROLLING MOTOR OF ENVIRONMENTALLY-FRIENDLY VEHICLE

CROSS-REFERENCE TO RELATED APPLICATION

This application claims priority to and the benefit of Korean Patent Application No. 10-2013-0120743 filed in the Korean Intellectual Property Office on Oct. 10, 2013, the entire contents of which are incorporated herein by reference.

BACKGROUND (a) Field of the Invention

The present invention relates to a method and system for controlling a motor of an environmentally-friendly vehicle, and more particularly, to a method and system for controlling a motor of an environmentally-friendly vehicle that improves a vibration characteristic of a motor using a nonlinear model of the motor.

(b) Description of the Related Art

As is well known in the art, an environmentally-friendly vehicle generally includes a fuel cell vehicle, an electric vehicle, a plug-in electric vehicle, and a hybrid vehicle, and typically includes a motor (e.g., driving motor) to generate driving force. A hybrid vehicle, which is an example of the environmentally-friendly vehicle, uses an internal combustion engine and power of a battery together. In other words, the hybrid vehicle efficiently combines and uses power of the internal combustion engine and power of the motor.

The hybrid vehicle typically includes, for example, as illustrated in FIG. 9, an engine 10, a motor 20, an engine clutch 30 to adjust power between the engine 10 and the motor 20, a transmission 40, a differential gear apparatus 50, a battery 60, an integrated starter-generator 70 that starts the engine 10 or generates electricity by output of the engine 10, and wheels 80. Further, the hybrid vehicle may include a hybrid control unit (HCU) 200 configured to operate the hybrid vehicle, an engine control unit (ECU) 110 configured to operate the engine 10, a motor control unit (MCU) 120 configured to operate the motor 20; a transmission control unit (TCU) 140 configured to operate the transmission 40; and a battery control unit (BCU) 160 configured to operate and manage the battery 60.

The battery control unit 160 may be a battery management system (BMS). The integrated starter-generator 70 may be an integrated starter & generator (ISG), or a hybrid starter & generator (HSG). The hybrid vehicle may be driven in a driving mode, such as an electric vehicle (EV) mode, which is an electric vehicle mode using only power of the motor 20, a hybrid vehicle (HEV) mode, which uses rotational force of the engine 10 as main power, and uses rotational force of the motor 20 as auxiliary power, and a regenerative braking (RB) mode that collects braking and inertial energy during driving by braking or inertia of the vehicle through electric generation of the motor 20 to charge the battery 60.

The environmentally-friendly vehicle including the hybrid vehicle generally drives and controls the motor M via a controller 300 illustrated in FIG. 1. Referring to FIG. 1, the controller 300 that operates the motor M, which rotates at an electrical angular velocity (We) is configured to receive a torque command Te* from an external system, and perform a series of processes to obtain a torque output Te based on the torque command Te*. The torque command received in the controller 300 is transmitted to a current command generator 311 to generate a specific current command based on an operation condition of the motor M.

The current command generated in the current command generator 311 is transmitted to the voltage command generator 312. The current command transmitted to the voltage command generator 312 is converted to a voltage command to be applied to the motor M based on the operation condition of the motor M. The voltage command output from the voltage command generator 312 is transmitted to a pulse width modulation (PWM) command generator 313. The voltage command transmitted to the PWM command generator 313 is converted to a PWM command based on the operation condition of the motor M. The PWM command output from the PWM command generator 313 is transmitted to the PWM voltage generator 314. The PWM command transmitted to the PWM voltage generator 314 is converted to a voltage in a PWM form based on the operation condition of the motor M, and the converted PWM voltage is applied to the motor M to drive the motor M.

Moreover, in a system for controlling a motor of the environmentally-friendly vehicle, a current command controller (not illustrated) operated in a synchronous coordinate system selects Idsr* (d-axis stator Reference current) and Iqsr* (q-axis stator Reference current) as current commands based on the demanded torque Te*. The selected current commands Idsr* and Iqsr* are a combination of current commands that output the demanded torque Te*. The current command controller operated in the synchronous coordinate system operates the motor M to output the torque Te based on the demanded torque Te* through a series of processes to cause currents Idsr and Iqsr based on the current commands Idsr* and Iqsr* selected by the operation condition of the motor M to flow in the motor M.

However, when the currents Idsr and Iqsr based on the current commands Idsr* and Iqsr* flow in the motor M, a torque Te having a different aspect from that of the demanded torque Te* may be generated by an inherent characteristic of the motor M and the controller 300. Particularly, when the characteristic is repeated according to a rotation of a rotor of the motor M, torque output vibrates, and vibration of a vehicle may be caused for an environmentally-friendly vehicle in which a motor system including the motor and the controller generates principal driving force of the vehicle. Accordingly, in the controller controlling output of the motor in the environmentally-friendly vehicle, torque output based on states of the motor and the controller and a change in the state needs to be substantially uniform using a control method in which torque output is not changed based on characteristics of the motor and the controller.

The above information disclosed in this section is only for enhancement of understanding of the background of the invention and therefore it may contain information that does not form the prior art that is already known in this country to a person of ordinary skill in the art.

SUMMARY

The present invention provides a system for controlling a motor of an environmentally-friendly vehicle that improves a vibration characteristic of a motor using a nonlinear model of the motor.

Further, the present invention provides a system for controlling a motor of an environmentally-friendly vehicle, in which the controller that operates the output of the motor in the environmentally-friendly vehicle uses a control method in which a torque output is not changed based on characteristics of the motor and the controller, to maintain the torque output based on states of the motor and the controller and a change in the states substantially uniform.

An exemplary embodiment of the present invention provides a system for controlling a motor that may include a controller configured to operate the motor within the environmentally-friendly vehicle; in which the controller may be configured to operate the motor to receive a torque command from an external system and output a torque based on the torque command from the motor, and may include: a current command generator configured to generate a specific current command based on the torque command received in the controller and a operation condition of the motor; a voltage command generator configured to generate a voltage command based on the current command output from the current command generator and the operation condition of the motor; a PWM command generator configured to generate a PWM command based on the voltage command output from the voltage command generator and the operation condition of the motor; a PWM voltage generator configured to convert the PWM command output from the PWM command generator to a voltage in a PWM form based on the operation condition of the motor, and apply the converted voltage to the motor; and a torque command optimizer configured to add and subtract an unwanted torque output Te_unwanted of the motor generated based on a nonlinear characteristic of the motor to and from the torque command Te*.

The torque command optimizer may include: an unwanted torque extractor configured to extract the unwanted torque output Te_unwanted of the motor as an unnecessary torque output; and an adder/subtractor configured to output a modified torque command Te*_mod by adding and subtracting the unwanted torque output Te_unwanted to and from the torque command Te*.

The torque command optimizer may further include: a motor position predictor configured to predict a position of a motor rotor and provide a predicted position to the unwanted torque extractor; and a torque attenuator configured to attenuate the unwanted torque output from the unwanted torque extractor to a predetermined value.

According to the exemplary embodiment of the present invention, the controller adjusting the output of the motor in the environmentally-friendly vehicle may use a control method in which a torque output is not changed based on characteristics of the motor and the controller, to maintain the torque output based on states of the motor and the controller and a change in the states substantially uniform.

DETAILED DESCRIPTION

Figure 1:
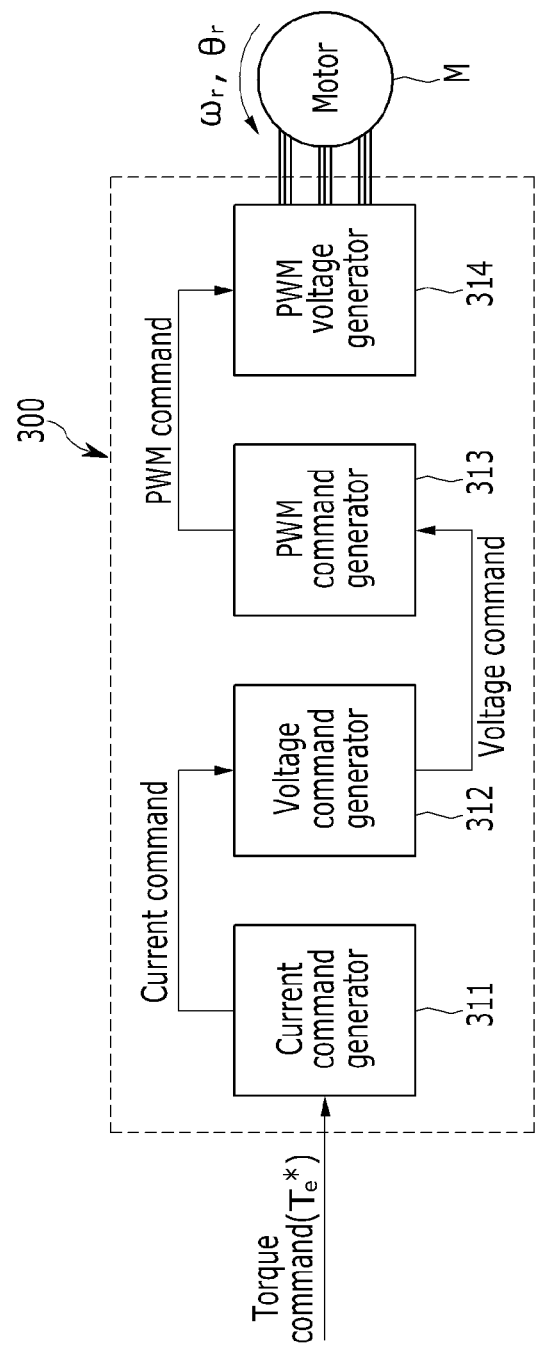
FIG. 1 is an exemplary block diagram illustrating a general motor control system of an environmentally-friendly vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully hereinafter with reference to the accompanying drawings, in which exemplary embodiments of the invention are shown. However, the present invention is not limited to the exemplary embodiment used herein and may be implemented in other forms. Like reference numerals designate like elements throughout the specification.

Figure 2:
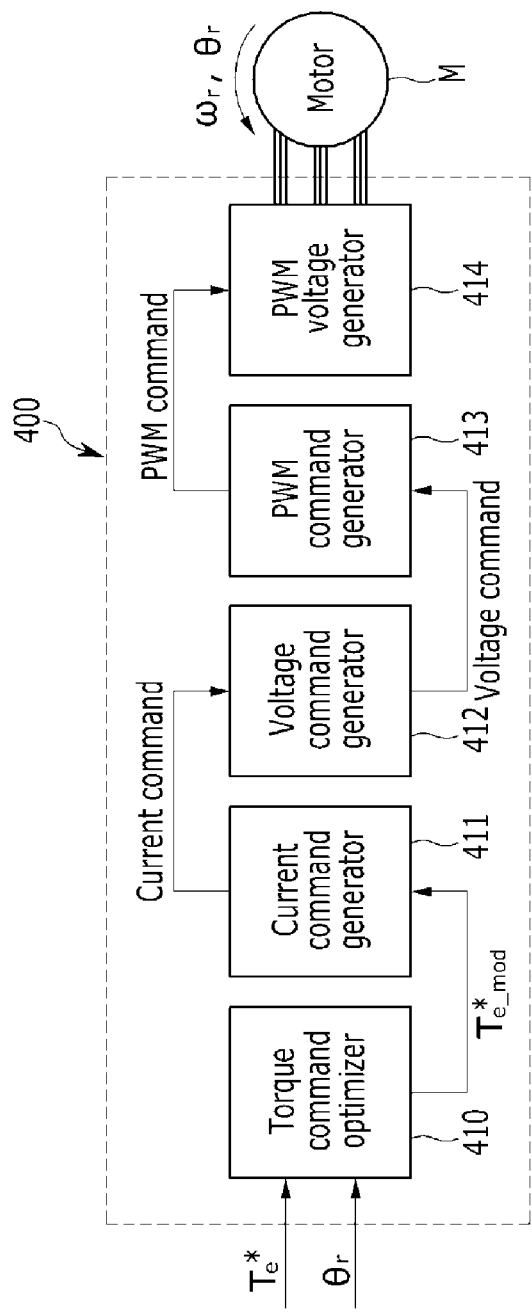
FIG. 2 is an exemplary configuration diagram of a motor control system of an environmentally-friendly vehicle according to an exemplary embodiment of the present invention.

FIG. 2 is an exemplary block diagram of a motor control system of an environmentally-friendly vehicle according to an exemplary embodiment of the present invention. The motor control system of the environmentally-friendly vehicle may optimally operate a motor using a nonlinear model of the motor. The motor control system of the environmentally-friendly vehicle according to the exemplary embodiment of the present invention may include a controller 400 configured to operate a motor M within the vehicle, and may be configured to operate the motor M to cause the controller 400 to receive a torque command Te* from an external system, and output the torque based on the torque command Te* to the motor M. The controller 400 may include an inverter, for example.

The controller 400 may include a current command generator 411 configured to generate a specific current command based on the torque command Te* received in the controller 400 and an operation condition of the motor M, a voltage command generator 412 configured to generate a voltage command to be applied to the motor based on the current command output from the current command generator 411 and the operation condition of the motor, a PWM command generator 413 configured to generate a pulse width modulation (PWM) command based on the voltage command output from the voltage command generator 412 and the operation condition of the motor M, a PWM voltage generator 414 configured to convert the PWM command output from the PWM command generator 413 to a voltage in the PWM form based on the operation condition of the motor M and apply the converted voltage to the motor M, and a torque command optimizer 410 configured to add and subtract an unwanted torque output (Te_unwanted) of the motor generated based on a nonlinear characteristic of the motor M to and from the torque command Te*.

The controller 400 may be a hardware formed of one or more microprocessors and electric/electronic elements operated by a predetermined program, and the predetermined program may be formed of a series of commands that perform an operation process of the motor control system of the environmentally-friendly vehicle according to an exemplary embodiment of the present invention to be described below. The torque command optimizer 410, the current command generator 411, the voltage command generator 412, the PWM command generator 413, and the PWM voltage generator 414 may be formed of a software module operated by a predetermined program, formed of a hardware module formed of electric/electronic elements, or may be formed of a combination module in which the software module is combined with the hardware module. Further, the current command generator 411, the voltage command generator 412, the PWM command generator 413, and the PWM voltage generator 414 may be the current command generator 311, the voltage command generator 312, the PWM command generator 313, and the PWM voltage generator 314 illustrated in FIG. 1.

Figure 3:
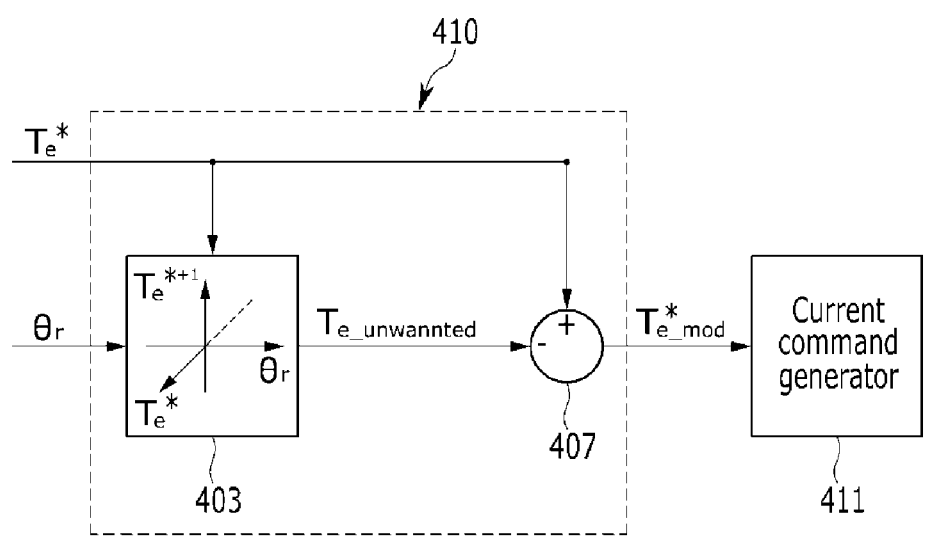
FIG. 3 is an exemplary configuration diagram illustrating a torque command optimizer in the motor control system of the environmentally-friendly vehicle according to the exemplary embodiment of the present invention.
Figure 4:
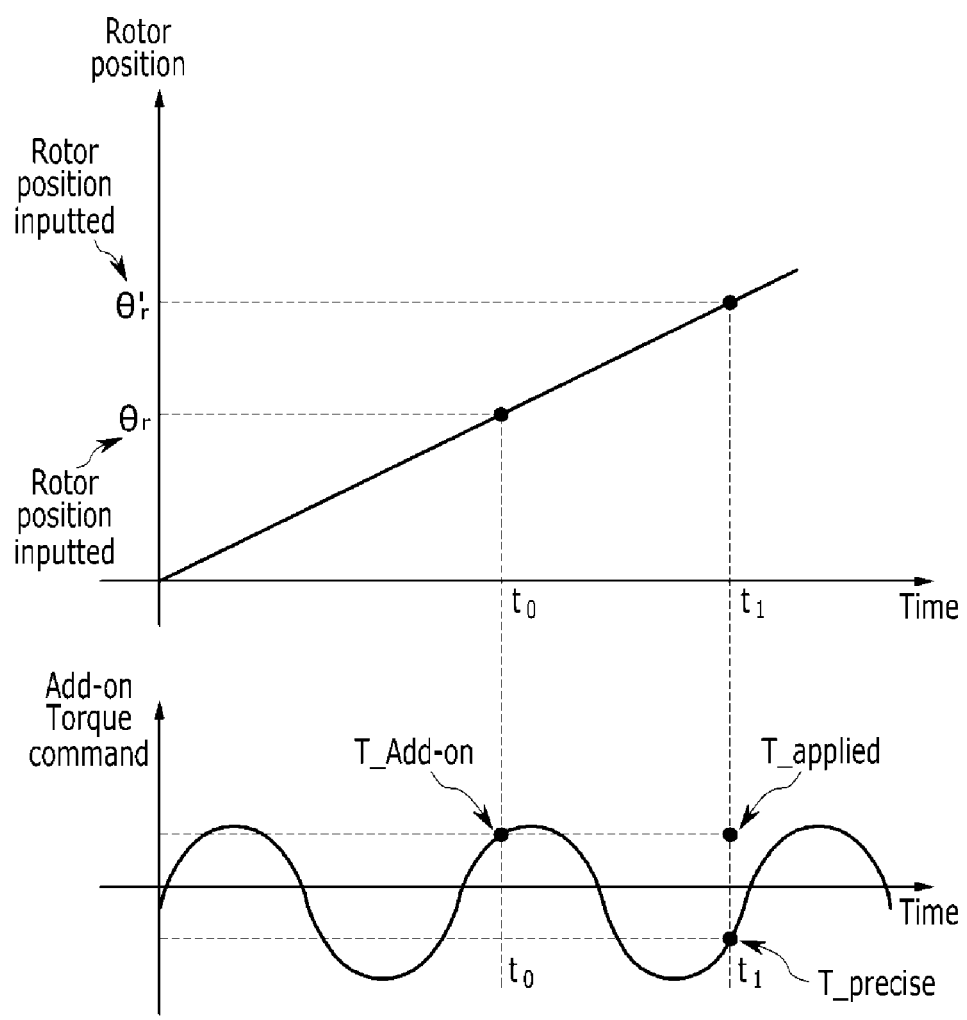
FIG. 4 is an exemplary graph illustrating a position of a motor rotor controlled by the motor control system of the environmentally-friendly vehicle according to the exemplary embodiment of the present invention.

As illustrated in FIG. 3, the torque command optimizer 410 may include an unwanted torque extractor 403 configured to extract the unwanted torque output Te_unwanted of the motor M as the unwanted torque output, and an adder/subtractor configured to output a torque command Te*_mod modified by adding and subtracting the unwanted torque output Te_unwanted to and from the torque command Te*. Further, as illustrated in FIG. 4, the torque command optimizer 410 may further include a motor position predictor 401 configured to predict a position of the rotor of the motor M and provide the predicted position to the unwanted torque extractor 403, and a torque attenuator 405 configured to attenuate the unwanted torque output Te*_unwanted output from the unwanted torque extractor 403 to a predetermined value.

Hereinafter, an operation of the motor control system of the environmentally-friendly vehicle according to the exemplary embodiment of the present invention will be described in detail with reference to the accompanying drawings.

Referring to FIG. 2, in the controller 400 configured to operate the motor M, the current command generator 411 may be configured to select the current commands Idsr* and Iqsr* to obtain the torque output Te based on the demanded torque Te*, and the voltage command generator 412 may be configured to select the voltage commands Vdsr* and Vqsr* to cause the currents Idsr and Iqsr according to the selected current commands Idsr* and Iqsr* to flow in the motor M. When voltages Vdsr and Vqsr based on the selected voltage commands Vdsr* and Vqsr* are applied to the motor M, Idsr and Iqsr flow in the motor M, and Te based on the torque command Te* may be output in the motor M. In particular, a relationship between Te and Idsr, Iqsr, Vdsr, and Vqsr is as follows.

$$dFlux = (Vqsr - Rs - Iqsr) \cdot \frac{1}{Wr} \qquad \text{Formula (1)}$$

$$qFlux = (-Vdsr + Rs \cdot Idsr) \cdot \frac{1}{Wr} \qquad \text{Formula (2)}$$

$$Te = Iqsr - dFlux - Idsr \cdot qFlux \qquad \text{Formula (3)}$$

Formula (1) represents a relationship between a d-axis of flux linkage (dFlux), the voltage Vqsr applied to the motor M, and the current Idsr that flows in the motor M using an equivalent model of a synchronous motor. In Formula (1), Rs is stator coil resistance of the motor, and Wr is an electrical angular velocity of the rotor of the motor. Formula (2) represents a relationship between a q-axis of flux linkage (qFlux), the voltage Vqsr applied to the motor M, and the current Iqsr that flows in the motor M using the equivalent model of the synchronous motor. In Formula (2), Rs is stator coil resistance of the motor M, and Wr is the electrical angular velocity of the rotor of the motor. Formula (3) represents a relationship between the torque output Te and the two axis currents Idsr and Iqsr formed in the motor M, and the two axis magnetic fluxes dFlux and qFlux.

The controller 400 configured to operate the motor M may output Te based on the demanded torque Te* by forming Idsr, Iqsr, dFlux, qFlux in the motor M. However, a nonlinear characteristic may be exhibited in the motor-controller system by structural shapes of the stator and the rotor of the motor, an electrical characteristic, and variety of a control method of the controller. In particular, the relationship between Idsr, Iqsr, dFlux, and qFlux may have a different aspect from those of general Formulae (1) and (2). The two axis voltages Vdsr and Vqsr that create the two axis currents Idsr and Iqsr flow may be expressed by a relationship of a polynomial that includes an n-degree harmonic term, in addition to a linear term represented in general Formulae (1) and (2).

The voltages Vqsr applied to the motor M may be expressed by a relationship of an n-degree polynomial as represented in Formula (4).

$$Vqsr = Rs \cdot Iqsr + dFlux \cdot Wr = \quad \text{Formula (4)}$$

$$\sum_{N=0}^{\infty} \left[ Vqsr_{(N)s} \cdot \sin(N - \theta r) + Vqsr_{(N)c} \cdot \cos(N \cdot \theta r) \right]$$

In Formula (4), θr is a position of the rotor of the motor M.

On the assumption that when the predetermined current Iqsr flows in the motor M, the electrical angular velocity Wr of the motor M and the coil resistance Rs of the stator of the motor M may be substantially uniform, and thus may not influence a control of the current, Formula (4) may be expressed by Formula (5).

$$Vqsr = \sum_{N=0}^{\infty} \left[ Vqsr_{(N)s} \cdot \sin(N \cdot \theta r) + Vqsr_{(N)c} \cdot \cos(N \cdot \theta r) \right] \quad \text{Formula (5)}$$

$$= Rs \cdot Iqsr +$$

$$\left\{ \sum_{N=0}^{\infty} \left[ dFlux_{(N)s} \cdot \sin(N \cdot \theta r) + dFlux_{(N)c} \cdot \cos(N \cdot \theta r) \right] \right\} \cdot Wr$$

$$= Rs \cdot Iqsr + dFlux_H \cdot Wr$$

The voltage Vdsr applied to the motor may be expressed by a relationship of an n-degree polynomial represented in Formula (6).

$$Vdsr = Rs \cdot Idsr - qFlux \cdot Wr \quad \text{Formula (6)}$$

$$= \sum_{N=0}^{\infty} \left[ Vdsr_{(N)s} \cdot \sin(N \cdot \theta r) + Vdsr_{(N)c} \cdot \cos(N \cdot \theta r) \right]$$

Here, θr is a position of the rotor of the motor.

On the assumption that when the predetermined current Iqsr flows in the motor M, the electrical angular velocity Wr of the motor M and the coil resistance Rs of the stator of the motor M may be substantially uniform, and thus may not influence a control of the current, Formula (6) may be expressed by Formula (7).

$$Vdsr = \sum_{N=0}^{\infty} \left[ Vdsr_{(N)s} \cdot \sin(N \cdot \theta r) + Vdsr_{(N)c} \cdot \cos(N \cdot \theta r) \right] \quad \text{Formula (7)}$$

$$= Rs \cdot Idsr +$$

$$\left\{ \sum_{N=0}^{\infty} \left[ qFlux_{(N)s} \cdot \sin(N \cdot \theta r) + qFlux_{(N)c} \cdot \cos(N \cdot \theta r) \right] \right\} \cdot Wr$$

$$= Rs \cdot Idsr - qFlux_H \cdot Wr$$

A torque equation expressed by multiplication of dFlux_H and qFlux_H expressed by the polynomials of Formulae (5) and (7) and the current expressed by Formula (3) may be as follows.

$$Te_H = Iqsr \cdot dFlux_H - Idsr \cdot qFlux_H \quad \text{Formula (8)}$$

$$= \sum_{N=0}^{\infty} \left[ Te_{(N)s} \cdot \sin(N \cdot \theta r) + Te_{(N)c} \cdot \cos(N \cdot \theta r) \right]$$

$$= Te_{(0)s} \cdot \sin(N \cdot \theta r) + Te_{(0)c} \cdot \cos(0 \cdot \theta r) +$$

$$\sum_{N=1}^{\infty} \left[ Te_{(N)s} \cdot \sin(N \cdot \theta r) + Te_{(N)c} \cdot \cos(N \cdot \theta r) \right]$$

$$= Te + Te_{Unwanted}$$

$$Te_{Unwanted} = \sum_{N=1}^{\infty} \left[ Te_{(N)s} \cdot \sin(N \cdot \theta r) + Te_{(N)c} \cdot \cos(N \cdot \theta r) \right] \quad \text{Formula (9)}$$

Formula (8) shows when the nonlinear characteristic exists in the motor-controller system despite the currents Idsr and Iqsr based on the current commands Idsr* and Iqsr* in the synchronous coordinate system based on the demanded torque Te* being formed in the motor M, the unwanted torque Te_unwanted may be generated in addition to the torque Te based on the demanded torque Te*. Accordingly, in the motor system including the nonlinear characteristic, the unwanted torque Te_unwanted may be added or subtracted to and from the torque command input to the current command generator 411 based on the nonlinear characteristic.

FIG. 3 is an exemplary detailed block diagram for the torque command optimizer 410 in which the unwanted torque Te_unwanted may be added and subtracted to and from the torque command Te* demanded in the motor-controller system. When a modification of the torque command by the unwanted torque Te_unwanted is necessary to output the torque command Te* demanded in the motor-controller system, the demanded torque Te* may be added and subtracted by the unwanted torque Te_unwanted by the unwanted torque extractor 403 and the adder/subtractor 407 of the torque command optimizer 410, and thus the torque command input to the current command generator 411 may be modified by the unwanted torque Te_unwanted. The unwanted torque extractor 403 of the unwanted torque optimizer 410 may be configured to receive two input variables Te* and θr and output the unwanted torque Te_unwanted as illustrated in FIG. 3.

One of the input variables may be the torque command Te* demanded in the motor-controller system, and the other input variable may be the position θr of the rotor of the motor M. The unwanted torque Te_unwanted having a degree that requires the modification of the torque command Te* based on the position θr of the rotor of the motor M, may be stored in the unwanted torque extractor 403. The unwanted torque extractor 403 of the torque command optimizer 410 may generally include a look-up table, and further, may also include forms, which may be expressed in a form of a polynomial, in addition to the look-up table. The unwanted torque Te_unwanted output from the unwanted torque extractor 403 may be used to be added and subtracted to and from the torque command Te* demanded by the motor-controller system via the adder/subtractor 407 to generate the modified torque command Te*_mod. The modified torque Te*_mod may be input to the current command generator 411 to be used as a control variable to output the torque Te based on the demanded torque Te*.

Moreover, as illustrated in FIG. 4, when the motor M is rotated at a predetermined velocity or greater, a time difference between a measured time of the position θr of the rotor of the motor M and a PWM output time of the PWM voltage generator 414 may be generated since a difference between a torque modifying value necessary for the PWM output time and an actually modified torque value may be generated.

In FIG. 4, the measured position of the rotor at t0 may be θr. In particular, a value output by the torque command optimizer 410 may be T-Add-on. Te_Add-on may be subject to a series of processes to the output of the PWM voltage generator 414 configured to generate the actual torque by the controller 400. In FIG. 4, the torque output via the PWM voltage generator 414 at time t1 may be T_applied, and may have a different value from that of modified torque T_precise necessary at a position θr' of the rotor at time t1. Accordingly, the position θr' of the rotor at a time point, at which a torque may be generated via the PWM voltage generator 414, may be input as the position θr' of the rotor input to the unwanted torque extractor 403 of the torque command optimizer 410, and the modified torque T_precise necessary at the position θr' of the rotor may be output as the output of the unwanted torque extractor 403.

Formula 10 below represents a process of calculating a modified position of the rotor θr_mod, which is a torque output point of the PWM voltage generator 414 through the position θr of the rotor input to the unwanted torque extractor 403.

$$\theta r\_mod = f\left(\frac{d\theta r}{dt}\right) \quad \text{Formula (10)}$$
$$= \theta r + \cdot \frac{d\theta r}{dt}(t1 - t0)$$

A modified position θr_mod of the rotor may be input to the unwanted torque extractor 403 with the demanded torque Te* to be used to extract an unwanted torque Te*_unwanted. The position of the rotor of the motor M may be predicted by the general motor position predictor 401 illustrated in FIG. 5, and the unwanted torque output by the unwanted torque extractor 403 may be attenuated by a predetermined value by the torque attenuator 405.

A mechanical system (not illustrated) connected to a driving shaft of the motor M operated by the system according to the exemplary embodiment of the present invention may have a structure in which force may be transmitted to a final output terminal via various transmission paths. A configuration component of the mechanical system may be an object having a mass, and when the mechanical system has a physical contact structure, the mechanical system may cause friction. A relationship between the rotation angular speed W and the torque Te in a general rotational mechanical system may be represented by Formula (11).

$$T_e = J\frac{d^2\theta}{dt^2} + B\frac{d\theta}{dt} + T_L \quad \text{Formula (11)}$$

In Formula (11), J is inertia moment of a rotating body, and is proportional to mass of the rotating body.

Furthermore, in the driving motor of the environmentally-friendly vehicle, the mass of the rotating body may be slightly changed based on weight of the vehicle itself, weight of passengers, and weight of luggage, but the mass of the rotating body may be changed more than that of the rotating body by the weight of the vehicle. A viscous friction coefficient B may be changed by states of a tire and a road, a clearance state of a gear system, and the like, but in general, the viscous friction coefficient B may be slightly changed in the unit of several tens to several hundreds of msec, which is a motor control period of the controller.

A disturbance torque TL is a value changed based on an external environment, and may be driving resistance, such as air resistance, rolling resistance, gradient resistance, and the like. The air resistance among the resistances is a value proportional to a square of a vehicle velocity, and the air resistance may be neglected when the vehicle velocity is substantially low, and may be obtained by an air resistance coefficient, a projected area of a front surface of the vehicle, and a multiplication of a square of the vehicle velocity at a speed equal to or greater than the substantially low speed. However, the TL may be slightly changed in the unit of several tens to several hundreds of msec, which is a control period of the controller.

An influence of a change in a phase of the rotor of the motor by the unwanted torque Te_unwanted in the motor system of the environmentally-friendly vehicle may have a relationship of a transfer function represented in Formula (12).

$$\frac{\frac{d\theta}{dt}(s)}{\text{Te\_unwanted}(s)} = \frac{1}{Js + B} \quad \text{Formula (12)}$$

Figure 6:
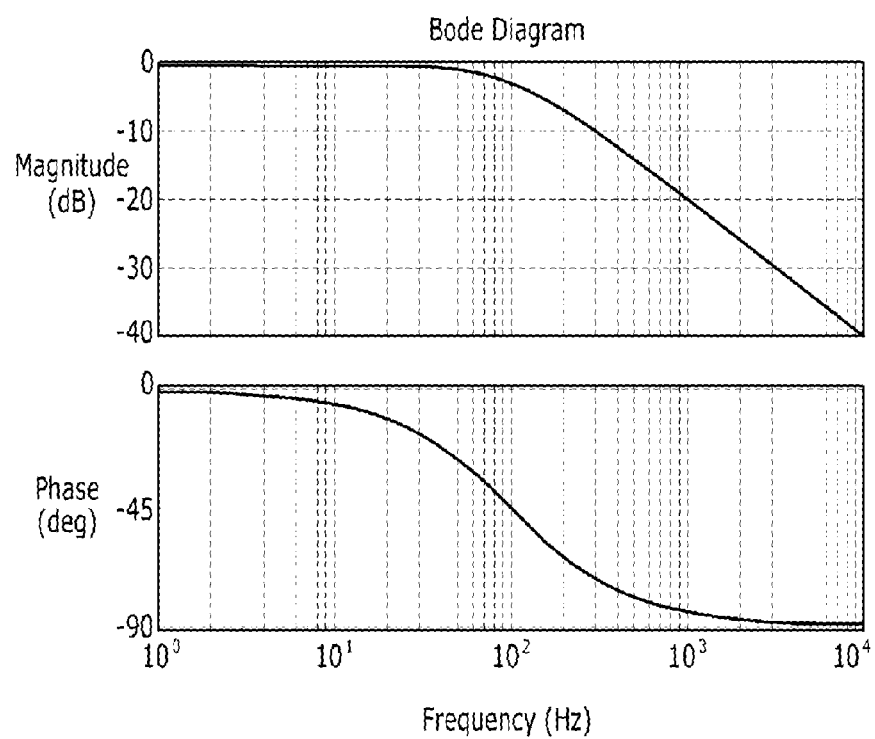
FIGS. 6 to 8B are exemplary graphs describing an operation of the motor control system of the environmentally-friendly vehicle according to the exemplary embodiment of the present invention.

According to Formula 12, a characteristic of the motor system may be changed based on a frequency as if rotational force output from the driving shaft of the motor M is transmitted through a vehicle power transmission system and passes through a filter. A change in a phase of the rotor of the motor by the unwanted torque Te_unwanted based on a frequency may be identified in a bode plot illustrated in FIG. 6. In FIG. 6, when the equal unwanted torque Te_unwanted is generated, as a change in the phase of the rotor of the motor increases (e.g., when a rapid change occurs), an influence of the change may be substantially small, and a phase characteristic that affects the change in the phase of the rotor of the motor may change.

Accordingly, even when the substantially same output of the same unwanted torque extractor 403, a necessity of the addition and the subtraction of the output may change based on a size of the change in the phase of the rotor of the motor. The characteristic may be considered in the torque attenuator 405 illustrated in FIG. 5, and a formula related to the characteristic is represented by Formula (13) below.

$$\text{Te\_unwanted} = Te^*\_\text{unwanted} \cdot a\left(\frac{d\theta}{dt}\right) + b \quad \text{Formula (13)}$$

Figure 5:
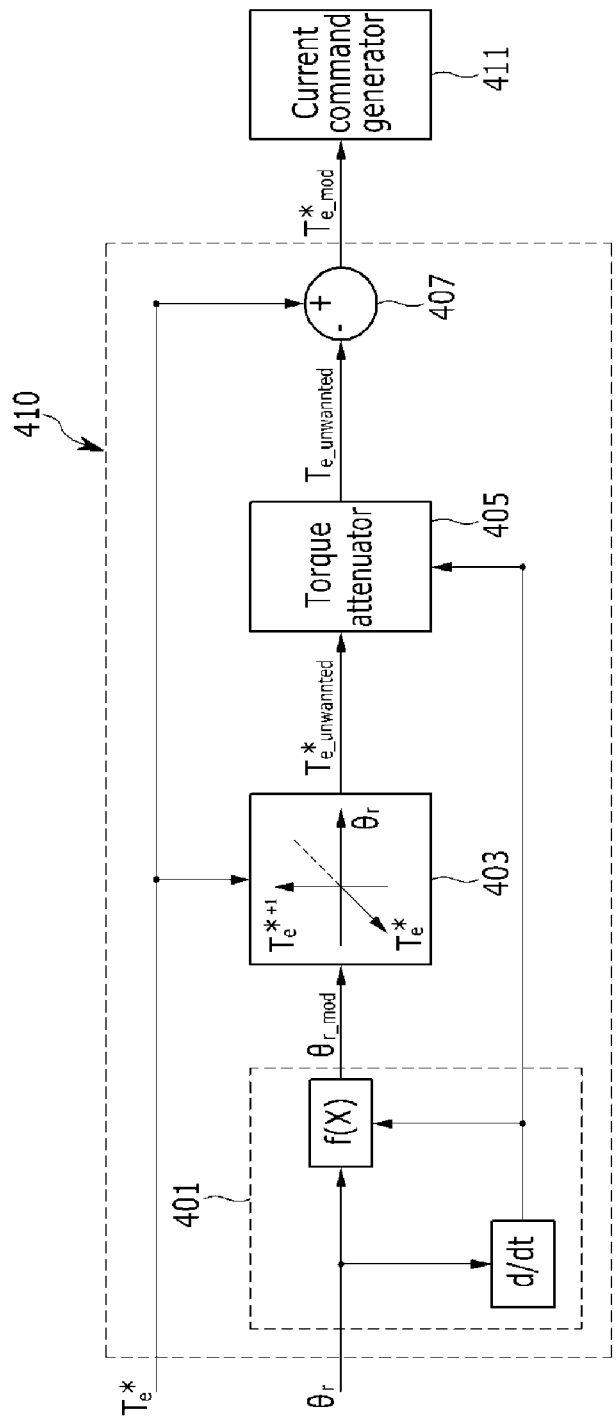
FIG. 5 is an exemplary configuration diagram illustrating another exemplary embodiment of the torque command optimizer in the motor control system of the environmentally-friendly vehicle according to the exemplary embodiment of the present invention.

In other words, the output Te*_unwanted of the unwanted torque extractor 403 in FIG. 5 may be input to the torque attenuator 405 of the torque command optimizer 410 with the change in the phase of the rotor of the motor per hour. The torque attenuator 405 may be configured to attenuate the output Te*_unwanted of the unwanted torque extractor 403 as the change in the phase of the rotor of the motor per hour increases (e.g., when a rapid change occurs). In Formula (13), a and b of the torque attenuator 405 are attenuation gains that adjust an attenuation degree based on a characteristic of the environmentally-friendly vehicle. The attenuation gain may be set as a constant, but an attenuation ratio may be variously established by establishing a table.

Figure 7A:
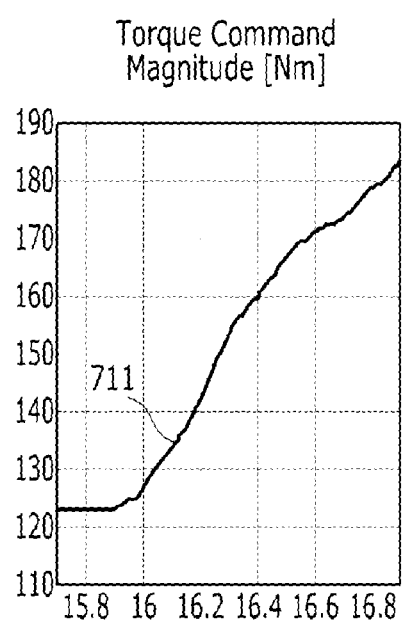
Figure 7B:
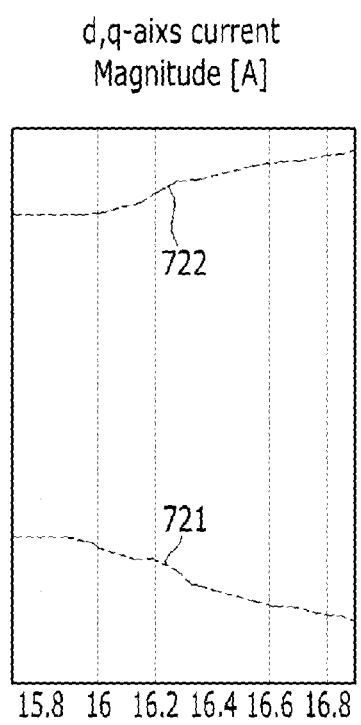

FIG. 7A illustrates a demanded torque 711 demanded in the motor-controller system when a general motor control method is used. The torque demanded in the motor-controller system may be input to the current command generator 411, and the current command generator 411 may be configured to generate two axis current commands 721 and 722 as illustrated in FIG. 7B.

Figure 8A:
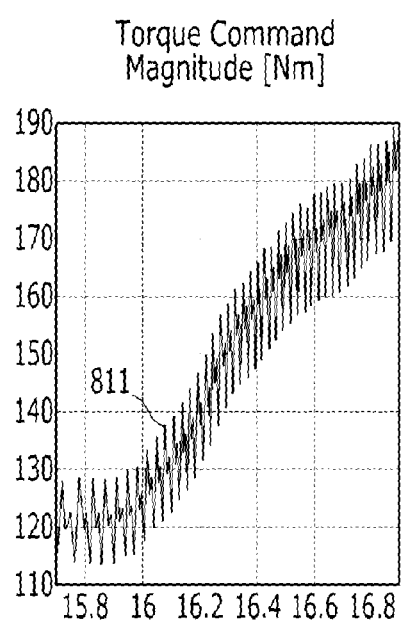
Figure 8B:
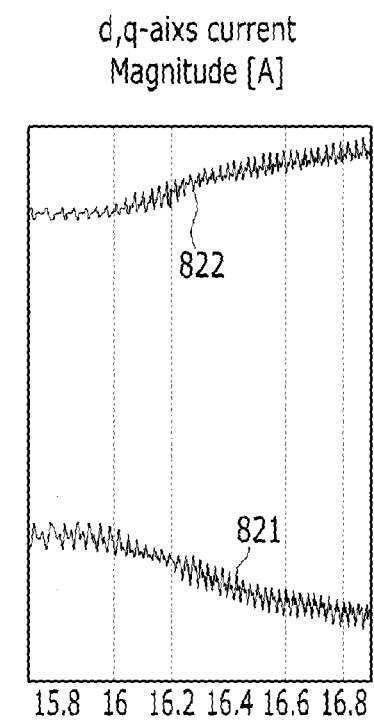
Figure 9:
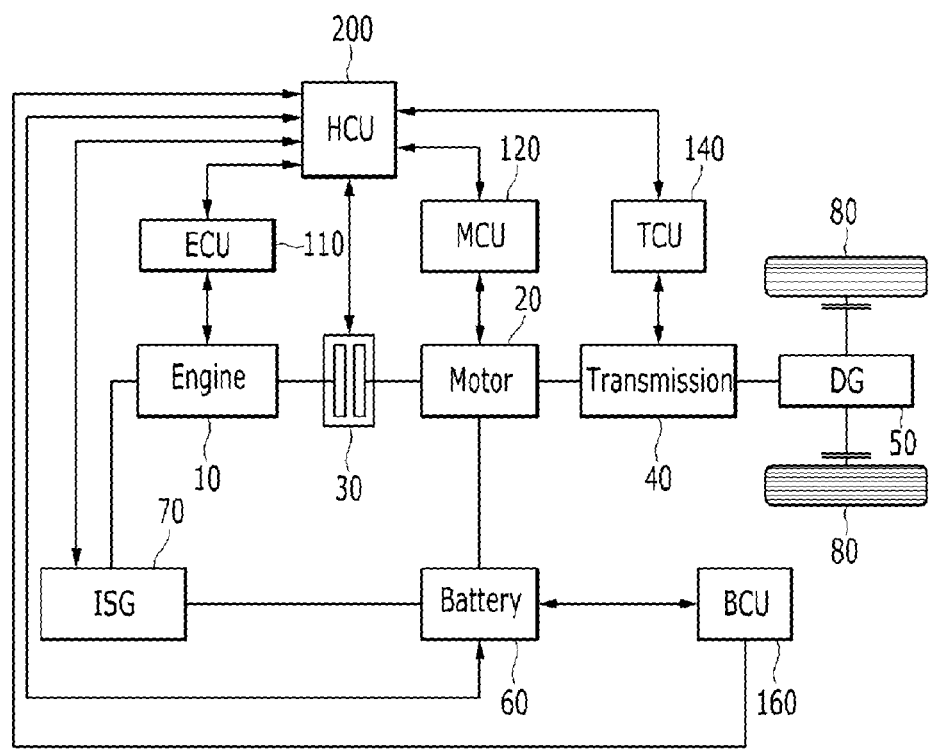
FIG. 9 is an exemplary block diagram schematically illustrating a hybrid vehicle, which is one of the environmentally-friendly vehicles according to the related art.

FIG. 8A illustrates the torque command modified to the modified torque command Te*_mod after the performance of the addition and the subtraction by the unwanted torque Te_unwanted through the torque command optimizer 410. The modified torque command Te*mod is denoted by reference numeral 811 in FIG. 8A. When the modified torque command 811 is input to the current command generator 411, the current command generator 411 may be configured to generate two axis current commands 821 (or at least two axis current commands 821) and 822 as illustrated in FIG. 8B. Accordingly, according to the exemplary embodiment of the present invention, it may be possible to improve a vibration characteristic of the motor using the nonlinear model of the motor.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

| Description of symbols | |
|---|---|
| 400: Inverter | 403: Unwanted torque extractor |
| 405: Torque attenuator | 410: Torque command optimizer |
| 411: Current command generator | 412: Voltage command generator |
| 413: PWM command generator | 414: PWM voltage generator |

What is claimed is:

1. A system for controlling a motor, comprising:
a controller configured to control the motor in the system, wherein the controller is configured to:
control the motor to receive a torque command from an external system;
output a torque based on the torque command from the motor:
generate a current command based on the torque command received in the controller and an operation condition of the motor;
generate a voltage command to be applied to the motor based on the generated current command and the operation condition of the motor;
generate a pulse width modulation (PWM) command based on the generated voltage command and the operation condition of the motor;
convert the generated PWM command to a voltage in a PWM form based on the operation condition of the motor;
apply the converted voltage to the motor;
subtract an unwanted torque output of the motor generated based on a nonlinear characteristic of the motor from the torque command;
predict a position of a rotor of the motor at a second time based on a position of the rotor that is measured at a first time, the second time being after the time;
extract the unwanted torque output of the motor as unnecessary torque based on the predicted position of the rotor;
attenuate the extracted unwanted torque output to a predetermined value; and
output a modified torque command by subtracting the attenuated unwanted torque output from the torque command.

2. The system of claim 1, wherein the controller is further configured to:
select current commands to obtain the torque output based on the torque command; and
select voltage commands to cause currents based on the selected current commands to flow in the motor,
wherein the torque output, the currents, and voltages based on the voltage commands satisfy the formulae below:

$$dFlux = (Vqsr - Rs \cdot Iqsr) \cdot \frac{1}{Wr}$$

$$qFlux = (-Vdsr + Rs \cdot Idsr) \cdot \frac{1}{Wr}$$

$$Te = Iqsr \cdot dFlux - Idsr \cdot qFlux$$

wherein dFlux is a d-axis of flux linkage, qFlux is a q-axis of flux linkage, Idsr is a d-axis stator Reference current, Iqsr is a q-axis stator Reference current, Vdsr is a d-axis stator Reference voltage, Vqsr is a q-axis stator Reference voltage, Rs is a stator coil resistance of the motor, Te is the torque output, and Wr is an electrical angular velocity of a motor rotor.

3. The system of claim 2, wherein the voltage applied to the motor is expressed by a formula selected from a group consisting of:

$$Vqsr = Rs \cdot Iqsr + dFlux \cdot Wr = \sum_{N=0}^{\infty}\left[V\underset{(N)_s}{qsr} \cdot \sin(N \cdot \theta r) + V\underset{(N)_c}{qsr} \cdot \cos(N \cdot \theta r)\right]$$

$$Vqsr = \sum_{N=0}^{\infty}\left[V\underset{(N)_s}{qsr} \cdot \sin(N \cdot \theta r) + V\underset{(N)_c}{qsr} \cdot \cos(N \cdot \theta r)\right]$$

$$= Rs \cdot Iqsr + \left\{\sum_{N=0}^{\infty}\left[dF\underset{(N)_s}{lux} \cdot \sin(N \cdot \theta r) + dF\underset{(N)_c}{lux} \cdot \cos(N \cdot \theta r)\right]\right\} \cdot Wr$$

$$= Rs \cdot Iqsr + dFlux_H \cdot Wr$$

$$Vdsr = Rs \cdot Idsr - qFlux \cdot Wr = \sum_{N=0}^{\infty}\left[V\underset{(N)_s}{dsr} \cdot \sin(N \cdot \theta r) + V\underset{(N)_c}{dsr} \cdot \cos(N \cdot \theta r)\right],$$

and $$Vdsr = \sum_{N=0}^{\infty}\left[V\underset{(N)_s}{dsr} \cdot \sin(N \cdot \theta r) + V\underset{(N)_c}{dsr} \cdot \cos(N \cdot \theta r)\right]$$

$$= Rs \cdot Idsr - \left\{\sum_{N=0}^{\infty}\left[qF\underset{(N)_s}{lux} \cdot \sin(N \cdot \theta r) + qF\underset{(N)_c}{lux} \cdot \cos(N \cdot \theta r)\right]\right\} \cdot Wr$$

$$= Rs \cdot Idsr - qFlux_H \cdot Wr$$

wherein dFlux is a d-axis of flux linkage, qFlux is a q-axis of flux linkage, Idsr is a d-axis stator Reference current, Iqsr is a q-axis stator Reference current, Vdsr is a d-axis stator Reference voltage, Vqsr is a q-axis stator Reference voltage, Rs is a stator coil resistance of the motor, Te is the torque output, Wr is an electrical angular velocity of a motor rotor, and θr is the position of the motor rotor.

4. The system of claim 3, wherein the torque output and the unwanted torque output are expressed by a polynomial torque output and unwanted torque output as represented in formulae below based on flux linages expressed by a polynomial, respectively:

$$Te_H = Iqsr \cdot dFlux_H - Idsr \cdot qFlux_H$$
$$= \sum_{N=0}^{\infty}\left[\underset{(N)_s}{Te}\cdot\sin(N\cdot\theta r) + \underset{(N)_c}{Te}\cdot\cos(N\cdot\theta r)\right]$$
$$= \underset{(0)_s}{Te}\cdot\sin(0\cdot\theta r) + \underset{(0)_c}{Te}\cdot\cos(0\cdot\theta r) +$$
$$\sum_{N=1}^{\infty}\left[\underset{(N)_s}{Te}\cdot\sin(N\cdot\theta r) + \underset{(N)_c}{Te}\cdot\cos(N\cdot\theta r)\right]$$
$$= Te + Te_{Unwanted},$$

and $$Te_{Unwanted} = \sum_{N=1}^{\infty}\left[\underset{(N)_s}{Te}\cdot\sin(N\cdot\theta r) + \underset{(N)_c}{Te}\cdot\cos(N\cdot\theta r)\right]$$

wherein, dFlux_$H$ is a polynomial d-axis of flux linkage, qFlux is a polynomial q-axis of flux linkage, Idsr is a d-axis stator Reference current, Iqsr is a q-axis stator Reference current, Te is the torque output, Te_unwanted is the unwanted torque output, and θr is the position of the motor rotor.

5. The system of claim 1, wherein the controller is further configured to calculate a modified position of the rotor using a formula below:

$$\theta r\_mod = f\left(\frac{d\theta r}{dt}\right)$$
$$= \theta r + \cdot \frac{d\theta r}{dt}(t1 - t0)$$

wherein, θr is the position of the motor rotor, θr_mod is the modified position of the rotor, t1 is a time interval, and t0 is a time interval different from t1.

6. A method for controlling a motor, comprising:
receiving, by a controller, a torque command from an external system;
outputting, by the controller, a torque based on the torque command:
generating, by the controller, a current command based on the received torque command and an operation condition of the motor;
generating, by the controller, a voltage command to be applied to the motor based on the generated current command and the operation condition of the motor;
generating, by the controller, a pulse width modulation (PWM) command based on the generated voltage command and the operation condition of the motor;
converting, by the controller, the generated PWM command to a voltage in a PWM form based on the operation condition of the motor;
applying, by the controller, the converted voltage to the motor;
subtracting, by the controller, an unwanted torque output of the motor generated based on a nonlinear characteristic of the motor from the torque command;
predicting, by the controller, a position of a rotor of the motor at a second time based on a position of the rotor that is measured at a first time, the second time being after the first time;
extracting, by the controller, the unwanted torque output of the motor as unnecessary torque based on the predicted position of the rotor;
attenuating, by the controller, the extracted unwanted torque output to a predetermined value; and
outputting, by the controller a modified torque command by subtracting the attenuated unwanted torque output from the torque command.

7. The method of claim 6, further comprising:
selecting, by the controller, current commands to obtain the torque output based on the torque command; and
selecting, by the controller, voltage commands to cause currents based on the selected current commands to flow in the motor,
wherein the torque output, the currents, and voltages based on the voltage commands satisfy the formulae below:

$$dFlux = (Vqsr - Rs \cdot Iqsr) \cdot \frac{1}{Wr}$$
$$qFlux = (-Vdsr + Rs \cdot Idsr) \cdot \frac{1}{Wr}$$
$$Te = Iqsr \cdot dFlux - Idsr \cdot qFlux$$

wherein dFlux is a d-axis of flux linkage, qFlux is a q-axis of flux linkage, Idsr is a d-axis stator Reference current, Iqsr is a q-axis stator Reference current, Vdsr is a d-axis stator Reference voltage, Vqsr is a q-axis stator Reference voltage, Rs is a stator coil resistance of the motor, Te is the torque output, and Wr is an electrical angular velocity of a motor rotor.

8. The method of claim 7, wherein the voltage applied to the motor is expressed by a formula selected from a group consisting of:

$$Vqsr = Rs \cdot Iqsr + dFlux \cdot Wr = \sum_{N=0}^{\infty}\left[\underset{(N)_s}{Vqsr}\cdot\sin(N\cdot\theta r) + \underset{(N)_c}{Vqsr}\cdot\cos(N\cdot\theta r)\right]$$

$$Vqsr = \sum_{N=0}^{\infty}\left[\underset{(N)_s}{Vqsr}\cdot\sin(N\cdot\theta r) + \underset{(N)_c}{Vqsr}\cdot\cos(N\cdot\theta r)\right]$$
$$= Rs \cdot Iqsr + \left\{\sum_{N=0}^{\infty}\left[\underset{(N)_s}{dFlux}\cdot\sin(N\cdot\theta r) + \underset{(N)_c}{dFlux}\cdot\cos(N\cdot\theta r)\right]\right\}\cdot Wr$$
$$= Rs \cdot Iqsr + dFlux_H \cdot Wr$$

$$Vdsr = Rs \cdot Idsr - qFlux \cdot Wr = \sum_{N=0}^{\infty}\left[\underset{(N)_s}{Vdsr}\cdot\sin(N\cdot\theta r) + \underset{(N)_c}{Vdsr}\cdot\cos(N\cdot\theta r)\right],$$

and $$Vdsr = \sum_{N=0}^{\infty}\left[\underset{(N)_s}{Vdsr}\cdot\sin(N\cdot\theta r) + \underset{(N)_c}{Vdsr}\cdot\cos(N\cdot\theta r)\right]$$
$$= Rs \cdot Idsr - \left\{\sum_{N=0}^{\infty}\left[\underset{(N)_s}{qFlux}\cdot\sin(N\cdot\theta r) + \underset{(N)_c}{qFlux}\cdot\cos(N\cdot\theta r)\right]\right\}\cdot Wr$$
$$= Rs \cdot Idsr - qFlux_H \cdot Wr$$

wherein dFlux is a d-axis of flux linkage, qFlux is a q-axis of flux linkage, Idsr is a d-axis stator Reference current, Iqsr is a q-axis stator Reference current, Vdsr is a d-axis stator Reference voltage, Vqsr is a q-axis stator Reference voltage, Rs is a stator coil resistance of the motor, Te is the torque output, Wr is an electrical angular velocity of a motor rotor, and θr is the position of the motor rotor.

9. The method of claim 8, wherein the torque output and the unwanted torque output are expressed by a polynomial torque output and unwanted torque output as represented in formulae below based on flux linages expressed by a polynomial, respectively:

$$Te_H = Iqsr \cdot dFlux_H - Idsr \cdot qFlux_H$$

$$= \sum_{N=0}^{\infty} \left[ Te_{(N)_s} \cdot \sin(N \cdot \theta r) + Te_{(N)_c} \cdot \cos(N \cdot \theta r) \right]$$

$$= Te_{(0)_s} \cdot \sin(0 \cdot \theta r) + Te_{(0)_c} \cdot \cos(0 \cdot \theta r) +$$

$$\sum_{N=1}^{\infty} \left[ Te_{(N)_s} \cdot \sin(N \cdot \theta r) + Te_{(N)_c} \cdot \cos(N \cdot \theta r) \right]$$

$$= Te + Te_{Unwanted},$$

and $$Te_{Unwanted} = \sum_{N=1}^{\infty} \left[ Te_{(N)_s} \cdot \sin(N \cdot \theta r) + Te_{(N)_c} \cdot \cos(N \cdot \theta r) \right],$$

wherein, dFlux_$H$ is a polynomial d-axis of flux linkage, qFlux is a polynomial q-axis of flux linkage, Idsr is a d-axis stator Reference current, Iqsr is a q-axis stator Reference current, Te is the torque output, Te_unwanted is the unwanted torque output, and θr is the position of the motor rotor.

10. The method of claim 6, further comprising:
calculating, by the controller, a modified position of the rotor using a formula below:

$$\theta r\_mod = f\left(\frac{d\theta r}{dt}\right)$$

$$= \theta r + \cdot \frac{d\theta r}{dt}(t1 - t0)$$

wherein, θr is the position of the motor rotor, θr_mod is the modified position of the rotor, t1 is a time interval, and t0 is a time interval different from t1.

11. A non-transitory computer readable medium containing program instructions, which when executed by a controller cause the controller to perform a plurality of steps, comprising:
receiving a torque command from an external system;
outputting a torque based on the torque command:
generating a current command based on the received torque command and an operation condition of the motor;
generating a voltage command to be applied to the motor based on the generated current command and the operation condition of the motor;
generating a pulse width modulation (PWM) command based on the generated voltage command and the operation condition of the motor;
converting the generated PWM command to a voltage in a PWM form based on the operation condition of the motor;
applying the converted voltage to the motor;
subtracting an unwanted torque output of the motor generated based on a nonlinear characteristic of the motor from the torque command;
predicting a position of a rotor of the motor at a second time based on a position of the rotor that is measured at a first time, the second time being after the first time;
extracting the unwanted torque output of the motor as unnecessary torque based on the predicted position of the rotor;
attenuating the extracted unwanted torque output to a predetermined value; and
outputting a modified torque command by subtracting the attenuated unwanted torque output from the torque command.

12. The non-transitory computer readable medium of claim 11, wherein the plurality of steps performed by the controller further comprise:
selecting current commands to obtain the torque output based on the torque command; and
selecting voltage commands to cause currents based on the selected current commands to flow in the motor,
wherein the torque output, the currents, and voltages based on the voltage commands satisfy the formula below:

$$dFlux = (Vqsr - Rs \cdot Iqsr) \cdot \frac{1}{Wr}$$

$$qFlux = (-Vdsr + Rs \cdot Idsr) \cdot \frac{1}{Wr}$$

$$Te = Iqsr \cdot dFlux - Idsr \cdot qFlux$$

wherein dFlux is a d-axis of flux linkage, qFlux is a q-axis of flux linkage, Idsr is a d-axis stator Reference current, Iqsr is a q-axis stator Reference current, Vdsr is a d-axis stator Reference voltage, Vqsr is a q-axis stator Reference voltage, Rs is a stator coil resistance of the motor, Te is the torque output, and Wr is an electrical angular velocity of a motor rotor.

13. The non-transitory computer readable medium of claim 12, wherein the voltage applied to the motor is expressed by a formula selected from a group consisting of:

$$Vqsr = Rs \cdot Iqsr + dFlux \cdot Wr = \sum_{N=0}^{\infty} \left[ Vqsr_{(N)_s} \cdot \sin(N \cdot \theta r) + Vqsr_{(N)_c} \cdot \cos(N \cdot \theta r) \right]$$

$$Vqsr = \sum_{N=0}^{\infty} \left[ Vqsr_{(N)_s} \cdot \sin(N \cdot \theta r) + Vqsr_{(N)_c} \cdot \cos(N \cdot \theta r) \right]$$

$$= Rs \cdot Iqsr + \left\{ \sum_{N=0}^{\infty} \left[ dFlux_{(N)_s} \cdot \sin(N \cdot \theta r) + dFlux_{(N)_c} \cdot \cos(N \cdot \theta r) \right] \right\} \cdot Wr$$

$$= Rs \cdot Iqsr + dFlux_H \cdot Wr$$

$$Vdsr = Rs \cdot Idsr - qFlux \cdot Wr = \sum_{N=0}^{\infty} \left[ Vdsr_{(N)_s} \cdot \sin(N \cdot \theta r) + Vdsr_{(N)_c} \cdot \cos(N \cdot \theta r) \right],$$

and $$Vdsr = \sum_{N=0}^{\infty} \left[ Vdsr_{(N)_s} \cdot \sin(N \cdot \theta r) + Vdsr_{(N)_c} \cdot \cos(N \cdot \theta r) \right]$$

$$= Rs \cdot Idsr - \left\{ \sum_{N=0}^{\infty} \left[ qFlux_{(N)_s} \cdot \sin(N \cdot \theta r) + qFlux_{(N)_c} \cdot \cos(N \cdot \theta r) \right] \right\} \cdot Wr$$

$$= Rs \cdot Idsr - qFlux_H \cdot Wr$$

wherein dFlux is a d-axis of flux linkage, qFlux is a q-axis of flux linkage, Idsr is a d-axis stator Reference current, Iqsr is a q-axis stator Reference current, Vdsr is a d-axis stator Reference voltage, Vqsr is a q-axis stator Reference voltage, Rs is a stator coil resistance of the motor, Te is the torque output, Wr is an electrical angular velocity of a motor rotor, and θr is the position of the motor rotor.

14. The non-transitory computer readable medium of claim 13, wherein the torque output and the unwanted torque output are expressed by a polynomial torque output and unwanted torque output as represented in formulae below based on flux linages expressed by a polynomial, respectively:

$$Te_H = Iqsr \cdot dFlux_H - Idsr \cdot qFlux_H$$

$$= \sum_{N=0}^{\infty} \left[ Te_{(N)_s} \cdot \sin(N \cdot \theta r) + Te_{(N)_c} \cdot \cos(N \cdot \theta r) \right]$$

$$= Te_{(0)_s} \cdot \sin(0 \cdot \theta r) + Te_{(0)_c} \cdot \cos(0 \cdot \theta r) +$$

$$\sum_{N=1}^{\infty} \left[ Te_{(N)_s} \cdot \sin(N \cdot \theta r) + Te_{(N)_c} \cdot \cos(N \cdot \theta r) \right]$$

$$= Te + Te_{Unwanted},$$

and $$Te_{Unwanted} = \sum_{N=1}^{\infty} \left[ Te_{(N)_s} \cdot \sin(N \cdot \theta r) + Te_{(N)_c} \cdot \cos(N \cdot \theta r) \right],$$

wherein, dFlux_$H$ is a polynomial d-axis of flux linkage, qFlux is a polynomial q-axis of flux linkage, Idsr is a d-axis stator Reference current, Iqsr is a q-axis stator Reference current, Te is the torque output, Te_unwanted is the unwanted torque output, and θr is the position of the motor rotor.

* * * * *